(12) United States Patent
Choudhury et al.

(10) Patent No.: US 9,589,323 B1
(45) Date of Patent: Mar. 7, 2017

(54) SUPER RESOLUTION IMAGE ENHANCEMENT TECHNIQUE

(71) Applicant: Sharp Laboratories of America, Inc., Camas, WA (US)

(72) Inventors: Anustup Kumar Choudhury, Vancouver, WA (US); Xu Chen, Vancouver, WA (US); Petrus J. L. van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 14/827,030

(22) Filed: Aug. 14, 2015

(51) Int. Cl.
*G06K 9/40* (2006.01)
*G06T 3/40* (2006.01)
*G06K 9/46* (2006.01)
*G06K 9/34* (2006.01)
*G06T 5/00* (2006.01)

(52) U.S. Cl.
CPC ............ *G06T 3/4053* (2013.01); *G06K 9/342* (2013.01); *G06K 9/46* (2013.01); *G06T 5/00* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 8,335,403 B2* | 12/2012 | Dai | ......................... | G06T 3/403 358/3.26 |
| 8,538,203 B2* | 9/2013 | Pan | ....................... | G06T 3/4007 348/240.99 |
| 8,630,464 B2* | 1/2014 | Whillock | ............. | G06K 9/0061 382/117 |
| 8,655,109 B2* | 2/2014 | Lin | ........................ | G06T 3/4053 382/299 |
| 8,687,923 B2 | 4/2014 | Lin et al. | | |
| 8,687,963 B2* | 4/2014 | Lin | ........................ | H04L 12/287 398/63 |
| 8,731,337 B2 | 5/2014 | Lin et al. | | |
| 2004/0218834 A1* | 11/2004 | Bishop | ................. | H04N 19/587 382/299 |
| 2007/0041663 A1* | 2/2007 | Cho | ....................... | G06T 3/4084 382/299 |
| 2010/0086227 A1* | 4/2010 | Sun | ........................ | G09G 5/391 382/254 |

(Continued)

OTHER PUBLICATIONS

H. Takeda, S. Farsiu and P. Milanfar, "Kernel Regression for Image Processing and Reconstruction," in IEEE Transactions on Image Processing, vol. 16, No. 2, pp. 349-366, Feb. 2007.*

(Continued)

*Primary Examiner* — Andrae S Allison
(74) *Attorney, Agent, or Firm* — Chernoff Vilhauer McClung & Stenzel, LLP

(57) ABSTRACT

A method for image enhancement may include selecting a plurality of patches of an image and determining at least one dimensionally reduced feature for each of the plurality of patches. The system may further determine a generally closest cluster from a set of clusters for each of the dimensionally reduced features and select a corresponding set of regression coefficients for each of the set of generally closest cluster. The system may also apply the selected set of regression coefficients to a corresponding patch to enhance the image.

24 Claims, 7 Drawing Sheets

(56) References Cited

U.S. PATENT DOCUMENTS

2010/0119157 A1* 5/2010 Kameyama .......... H04N 19/115
                                              382/195
2012/0134579 A1* 5/2012 Kameyama .......... G06T 3/4053
                                              382/159
2013/0170767 A1* 7/2013 Choudhury .......... G06T 3/4053
                                              382/260

OTHER PUBLICATIONS

Hong Chang, Dit-Yan Yeung and Yimin Xiong, "Super-resolution through neighbor embedding," Computer Vision and Pattern Recognition, 2004. CVPR 2004. Proceedings of the 2004 IEEE Computer Society Conference on, Washington, DC, USA, 2004, pp.*
Y. Zhu, Y. Zhang and A. L. Yuille, "Single Image Super-resolution Using Deformable Patches," 2014 IEEE Conference on Computer Vision and Pattern Recognition, Columbus, OH, 2014, pp. 2917-2924.*
Yang et al, Image super-resolution via sparse representation, IEEE Transactions on Image Processing archive, vol. 19 Issue 11, Nov. 2010 pp. 2861-2873.*
Glasner et al., Super-Resolution from a Single Image, International Conference on Computer Vision, 2009, 8 pgs.
Sun et al., Context-Constrained Hallucination for Image Super-Resolution, CVPR 2010, 8 pgs.
He et al., Single Image Super-Resolution using Gaussian Process Regression, CVPR 2010, 8 pgs.
Fattal, Image Upsampling via Imposed Edge Statistics, SIGGRAPH 2007, 8 pgs.
Freeman et al., Example-Based Super-Resolution, IEEE Computer Graphics and Applications 2002, 10 pgs.
Sun et al., Image Super-Resolution using Gradient Profile Prior, CVPR 2008, 8 pgs.
Kim et al., Single-Image Super-resolution Using Sparse Regression and Natural Image Prior, PAMI vol. 32, No. 6, 8 pgs., 2010.
Yang et al., Fast Direct Super-Resolution by Simple Functions, International Conference on Computer Vision 2013, 8 pgs.
Timofte et al., Anchored Neighborhood Regression for Fast Example-Based Super-Resolution, International Conference on Computer Vision 2013, pp. 1920-1927.
Timofte et al., A+: Adjusted Anchored Neighborhood Regression for Fast Super-Resolution, ACCV 2014, 15 pgs.
Yang et al., Image Super-Resolution Via Sparse Representation, IEEE TIP 2010, 13 pgs.
Tai et al., Super Resolution using Edge Prior and Single Image Detail Synthesis, CVPR 2010, 8 pgs.
Gross, Multi-PIE, IEEE International Conference on Automatic Face and Gesture Recognition, 2008, 8 pgs.
Aghagolzadeh et al., Kernel Smoothing for Jagged Edge Reduction, ICASSP, 2013, 5 pgs.

* cited by examiner

VISUALIZATION OF ENERGY VERSUS DIMENSIONALITY

SUPER RESOLUTION IMAGE ENHANCEMENT TECHNIQUE

CROSS-REFERENCE TO RELATED APPLICATIONS

None.

BACKGROUND OF THE INVENTION

Super-resolution techniques generate high-resolution (HR) images from one or more low-resolution (LR) images. With the improvement in the resolution of image capture technology, even though there are capture and display devices that can produce high-resolution images and videos, there are many existing low-resolution images and videos that can be found in surveillance videos, mobile devices, and broadcast content. In order to improve the user experience while watching such content on higher resolution display devices, such as high definition display device, 4K display device, or 8K display device, the input video should be increased in resolution to match that of the display. Accordingly, often the super-resolution technique predicts thousands of unknown pixel values from a small fraction of input pixels. This is inherently an ill-posed problem and the ambiguity increases as the scaling factor increases. The amount of information that is "missing" in a low resolution image relative to the target high resolution image is very large, in terms of fine detail and high frequency information that contributes to the perception of a high quality rendered image on a high resolution display. Existing techniques have a limited ability to restore and enhance fine image detail. It is desirable to reconstruct and enhance image detail with a high quality result even at increased upscaling factors. Existing techniques for super-resolution image and video upscaling often require very high computational cost. Some techniques combine images of a scene or multiple frames of a video to enhance resolution, which may incur high memory or data transfer costs. Some techniques utilize iterative optimization approaches to enhance resolution, which may incur high computational cost. It is also desirable to perform super-resolution image generation at a limited computational cost. It is desirable for a super resolution image enhancement system that uses a single low resolution input image to generate a high resolution output image.

The foregoing and other objectives, features, and advantages of the invention may be more readily understood upon consideration of the following detailed description of the invention, taken in conjunction with the accompanying drawings.

DETAILED DESCRIPTION OF PREFERRED EMBODIMENT

Figure 1:
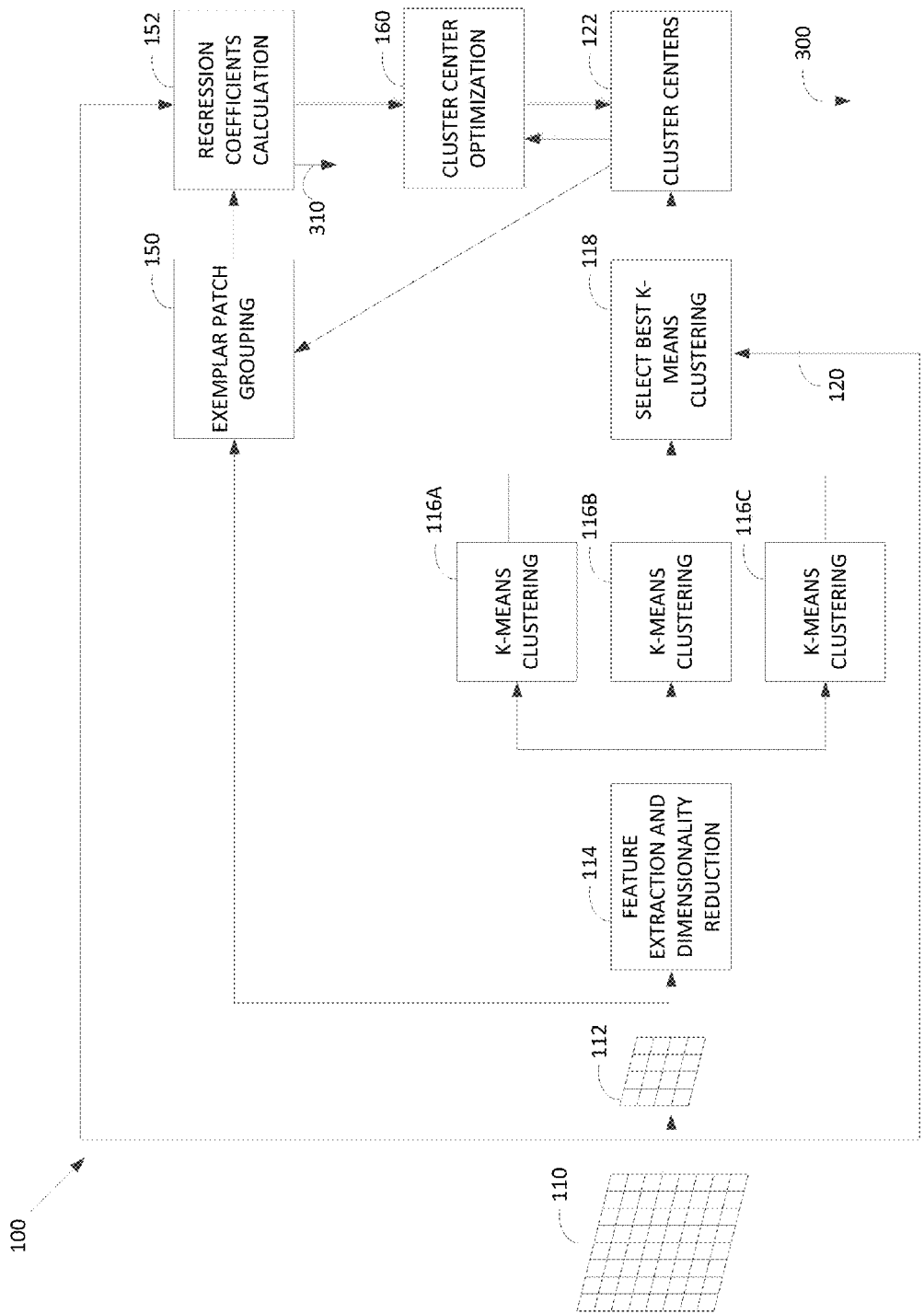
FIG. 1 illustrates an exemplary training technique.

Referring to FIG. 1, a super-resolution technique includes a training phase 100 to create a model that is used for a subsequent resolution enhancement technique. During the training phase, the system uses a database of high resolution (HR) training images 110. Preferably, the HR training images 110 are representative of natural images with fine detail, such as scenery and/or items and/or people, rather than synthetic computer generated graphics. For each HR training image 110 $I_h$, the system may obtain a corresponding low resolution (LR) image 112 $I_l$. For example, the corresponding LR image 112 may be computed as follows: $I_l=(I_h*G)/\downarrow$. * denotes convolution, G is a Gaussian Kernel, and $\downarrow$ is a down-sampling operator. Other filter kernels and other degradation operations may be used as appropriate. A database of LR images 112 corresponding to the HR images 110 may be used. Using a suitable technique, the system may use any set of HR images and determine a corresponding LR image for each.

It is desirable to convert the LR images 112 to a different space, such as a feature space, to further characterize the image content. The LR images may be processed to perform feature extraction and dimensionality reduction 114 based upon patches of the LR images 112. In particular, using raw pixel values during subsequent clustering provides limited generalization properties. Rather than using raw pixel values during subsequent clustering, it is preferable to use a feature, such as a gradient feature. For example, first and second order gradients may be used to characterize features of the low resolution patches of the low resolution images 112. Four 1-D filters may be used to extract the first and second order derivatives or gradients in horizontal and vertical direction as follows:

$$f_1=[-1,0,1], f_2=f_1^T$$

$$f_3[1,-2,1], f_4=f_3^T$$

The system processes image data on a patch-by-patch basis, where a patch includes a small block of image pixels. For example a patch may correspond to a 7×7 block of pixels in the LR image. As another example, each LR image patch may include 45 pixels in a small neighborhood or image area. The computation of the gradients in the manner above increases the dimensionality of the LR patch from 45 to 180, thus increasing the computational complexity of the system.

Figure 2:
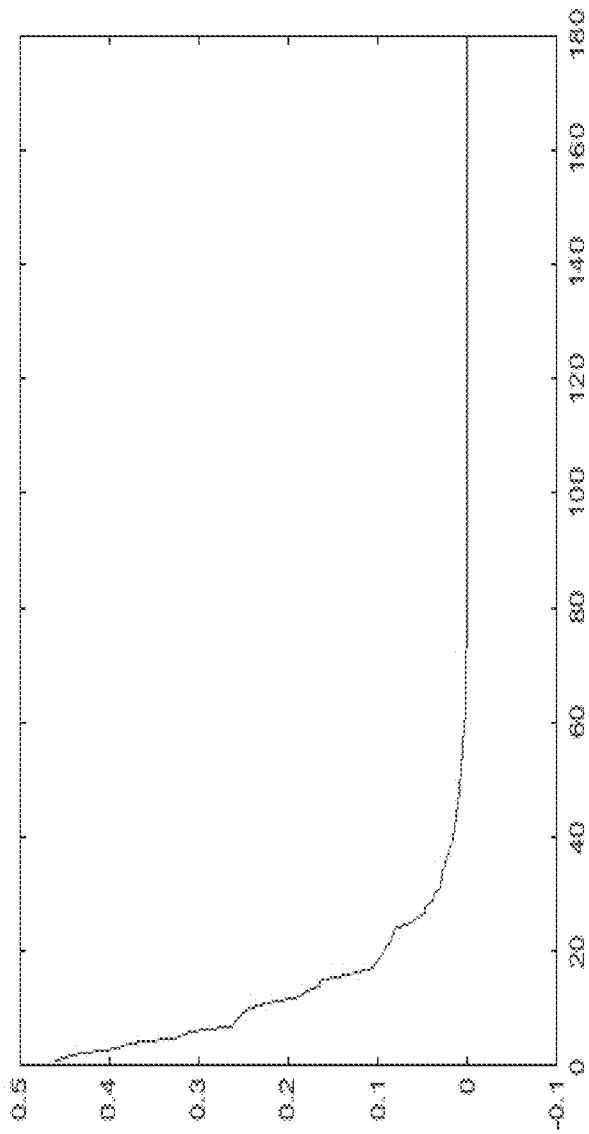
FIG. 2 illustrates a graph of visualization of energy versus dimensionality.

To both reduce the computational complexity and increase the discriminative property amongst the features, the system may apply a principal component analysis dimensionality reduction. The principal component analysis projects the features to a lower-dimensional space. For example, the principal component analysis, either linear or non-linear, may be used to reduce the dimensionality from 180 dimensions to 36 dimensions, thus reducing the dimensionality of the features by 80%. Referring to FIG. 2, a graph of the visualization of energy versus dimensionality may be observed. The principal component analysis results in information primarily along horizontal, vertical, and diagonal edges together with a representation of texture. Further, the use of the principal component analysis results in a reduction in jaggy artifacts during reconstruction. Any technique may be used to characterize features of the images, such as on a patch basis, and any technique may be used for dimensionality reduction, if desired. In addition, a suitable technique that extracts compact features directly from the image in a single step may be used instead of the 2-step feature extraction and dimensionality reduction process. In addition, suitable normalization techniques may be applied to the features, such as thresholding, clipping and normalizing by their vector norm.

The system may then cluster all, or a selected set of, the dimensionally reduced extracted features 114 of the LR patches in a manner that optimizes the visual quality of the super-resolution image output. A first step towards determining optimized patch feature clusters may include K-means clustering 116. K-means clustering is a well-known technique of vector quantization of the features that performs cluster analysis in the data by partitioning N observations into K clusters in which each observation belongs to the cluster with the nearest mean or cluster center, serving as the prototype of the cluster. This may be performed, for example, using a technique similar to an expected-maximization technique for mixtures of Gaussian distributions via an iterative refinement. Each of the cluster centers may be considered to be representative of the feature space of the natural image patches. For each cluster, the system may collect a fixed number of exemplar training patches, which reduces the computational complexity of the system. Other clustering techniques may likewise be used, if desired.

As described above using the K-means clustering, the collection of a fixed number of exemplar training patches for each cluster is used to train a mapping function. It has been observed that some clusters in the feature space have very few corresponding exemplar training patches. While having a very limited number of exemplary training patches for some clusters may be useful in efficiently determining the feature, it turns out that using such a limited set of corresponding training patches results in poor subsequent reconstruction of a high resolution image and also results in undesirable artifacts in the reconstruction of the high resolution image. Accordingly, in the case of cluster centers having a fewer number of corresponding low resolution patches than a threshold, it is preferable to include additional low resolution training patches for those cluster centers. The additional training patches may correspond to its M nearest neighbor clusters, which may be determined using a distance metric. The selection and grouping of the additional training patches in this manner from its nearest neighboring clusters results in an increased probability that those training patches are close in appearance to one another. Also, for clusters that are close to one another and do not have sufficient exemplar training patches, it increases robustness of subsequent regression coefficients, described later, since the same samples can be shared with neighboring clusters.

As previously described, the exemplar training patches may be used to train the mapping function based on the K-means clustering 116. The system may apply multiple different rounds of K-means clustering 116A-116C. The different rounds of K-means clustering may be initialized with different randomized seeds so that different clustering outcomes are obtained. The different rounds of K-means clustering may be based upon different clustering techniques for the data. One of the different K-means clustering 116A-116C may be selected as the best clustering result 118, as described below.

To determine which of the K-means clustering results is preferable, or otherwise more representative of the HR image content, the system may use "ground truth" HR information 120 to validate the clustering process based on a reconstruction error to select the best K-means clustering result 118. This reconstruction error may be a residual sum of squared errors (RSS) aggregated over all training patches. The residual sum of squared errors is evaluated between the ground truth HR image data and predicted high resolution image data that is generated by applying regression coefficients, where the regression coefficients are determined as described below.

With the best K-means clustering outcome 118 selected, this results in a set of cluster centers 122. Each of the cluster centers 122 is representative of a clustering of a set of LR patches from the low resolution training images 112. Also, the clustering centers 122 may be associated with a database of the LR patches corresponding to each of the cluster centers 122. It is noted that in some cases, one patch may correspond to multiple different cluster centers. The cluster centers 122 may be provided to the high resolution image generation process 300. In particular, the cluster centers 122 may be used to characterize a low resolution input patch of an input image provided during the high resolution image generation process. However, while the cluster centers 122 may be used to characterize a low resolution input patch of the input images of the high resolution image generation phase, there also needs to be a function provided to the high resolution image generation phase that characterizes the corresponding unknown high resolution patch for the resolution upsampling.

A set of exemplar patches are identified 150 based upon the cluster centers 122. This may be provided by way of a known relationship between the cluster centers 122 and the corresponding low resolution input patches. In this manner, the cluster centers identify the groups of patches 150 of the low resolution images corresponding with each of the cluster centers. The exemplary patches 150 of the low resolution images are provided together with the corresponding patches of the high resolution images 110 to a regression coefficients calculation process 152. A set of regression coefficients may be determined 152 to characterize a corresponding high resolution patch based upon a low resolution patch. Other techniques may be used to determine a high resolution patch based upon a low resolution patch. The output of the regression coefficients calculation process 152 may be a set of regression coefficients 310 for each corresponding cluster center 122.

For example, for each cluster using information from the corresponding exemplar patches, the system may learn a mapping function based upon a least squares approximation. The regression coefficients of the mapping function may be determined by linear least-squares minimization as follows:

$$C_i^* = \mathrm{argmin}_{C_i} \left\| W_i - C_i \begin{bmatrix} X_i \\ 1 \end{bmatrix} \right\|_2^2.$$

$C_i^*$ are the regression coefficients for each cluster i, $W_i$ are the samples of the group of HR patches associated with cluster i collected in a matrix, $X_i$ are the samples of the LR patches associated with cluster i collected in a matrix, and "1" is a vector with the same number of elements as the number of training patches in $X_i$ filled entirely with ones. These regression coefficients differ for each cluster and storing them results in a computational efficiency increase of the high resolution image generation process. Preferably, during the computation of the regression coefficients, the system first computes the mean of each LR patch and determines the LR samples as the intensity samples subtracting the mean of that patch. For the HR samples, the system may subtract the mean of the corresponding LR patch from the intensity samples of the HR patch. Instead of using the mean, the system may also use a filtered version of the LR patch to emphasize fine detail in the LR and HR samples used for regression. In addition, the system may use other forms of normalization of the LR and HR patch samples before calculating regression coefficients.

Referring to FIG. 1, the system may include an additional cluster center optimization stage 160. It is the goal of the cluster center optimization stage to further improve the visual quality of the super-resolution image output. This optimization stage performs further minimization of the reconstruction error during the training phase 100. The reconstruction error may be a residual sum of squared errors (RSS) aggregated over all training patches. The residual sum of squared errors is evaluated between the ground truth HR image data and predicted high resolution image data that is generated by applying regression coefficients. The reconstruction error may be minimized during the training phase in an iterative manner, using known nonlinear optimization algorithms. For example, a simplex algorithm may be used for minimization. The reconstruction error minimization process 160 may start with the cluster centers that are determined as described above and compute the reconstruction error as described above. The process may then determine new candidate cluster center locations, and determine the corresponding regression coefficients as described above, and again compute the reconstruction error (for example, RSS) as described above. In this manner, the system may iteratively minimize the reconstruction error and achieve improved visual quality of the high resolution output images.

Figure 3:
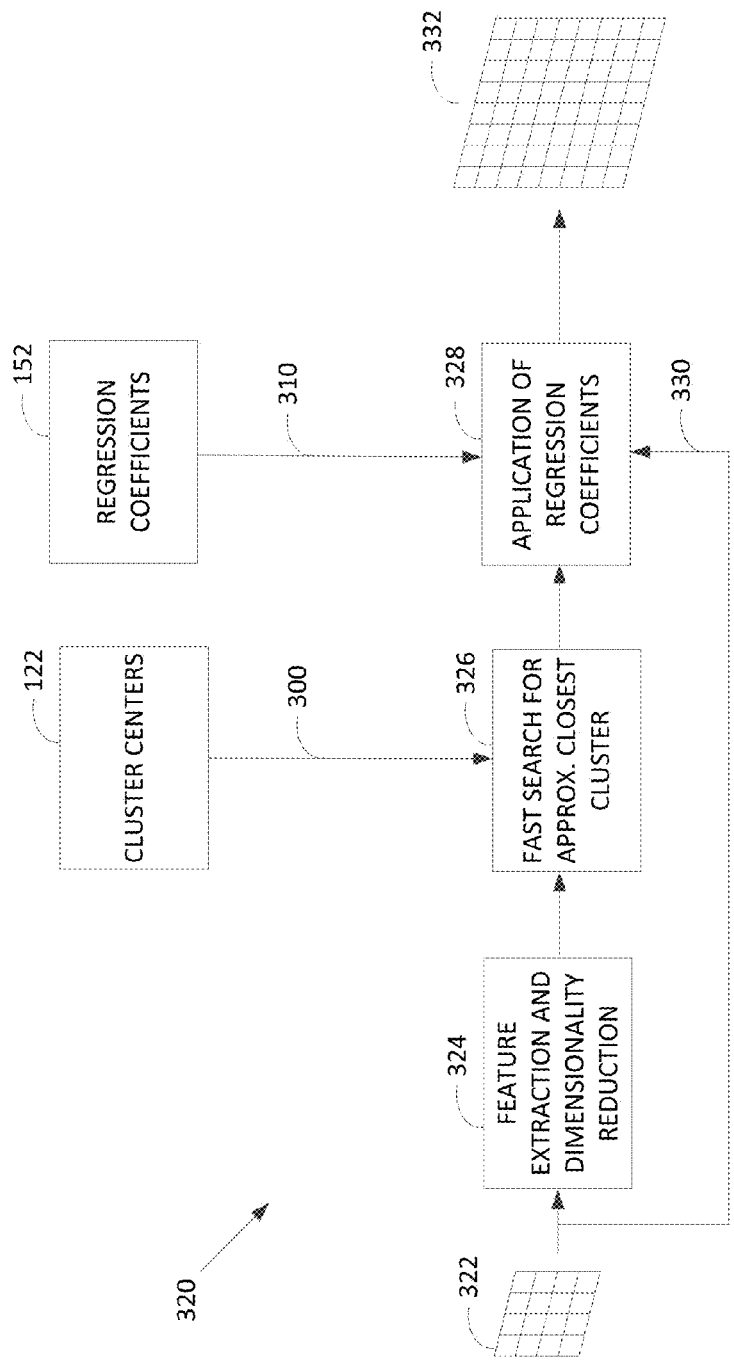
FIG. 3 illustrates an exemplary high resolution image generation technique.

Referring to FIG. 3, during the high resolution image generation process 320 a low-resolution (LR) image 322 is received. The LR image 322 is processed in a patch-by-patch manner. The low-resolution image 322 may be processed using a feature extraction and dimensionality reduction 324. The feature extraction and dimensionality reduction that is applied to each patch in the LR input image 324 preferably matches the feature extraction and dimensionality reduction 114 so that the feature extraction and dimensionality reduction outputs mirror one another. If desired, the feature extraction and/or dimensionality reduction 324 and 114 may be different from one another.

A fast search for approximate closest cluster 326 using the output of the feature extraction and dimensionality reduction 324 may be performed based upon the output 300 of the cluster centers 122. While the search may be performed in a linear and exhaustive fashion, it tends to be a computationally intensive step. Instead of looking for the exact nearest neighbor cluster center it is preferable to use a KD-Tree to perform a non-exhaustive, approximate search for the nearest neighbor cluster center. The KD-Tree is a generalization of a binary search tree that stores k-dimensional points. The KD-Tree reduces the computational time needed to find a suitable cluster center given the input LR features. The KD-Tree data-structure is preferably computed off-line during the training stage, and is subsequently used during the high resolution image generation stage. Other approximate search techniques may be likewise used, as desired. As an example, another known technique is based on using hashing tables.

With the closest cluster 326 identified for the patch of the LR input image 322, the system may apply regression coefficients 328 to the LR input patch 330 based upon the regression coefficients 310 associated with the closest cluster center, provided as a result of the training stage. For example, the regression coefficients of the mapping function may be obtained by linear least-squares minimization as follows:

$$C_i^* = \mathrm{argmin}_{C_i} \left\| W_i - C_i \left[ \frac{X_i}{1} \right] \right\|_2^2.$$

Where $C_i$ are the regression coefficients for each cluster i, $W_i$ are the samples of the group of HR patches associated with cluster i collected in a matrix, $X_i$ are the samples of the LR patches associated with cluster i collected in a matrix, and "1" is a vector with the same number of elements as the number of training patches in $X_i$ filled entirely with ones. In this manner, the corresponding regression coefficients that were determined during the training stage are applied to input LR patches during the high resolution image generation stage in order to determine an appropriate high resolution image 332.

Figure 4:
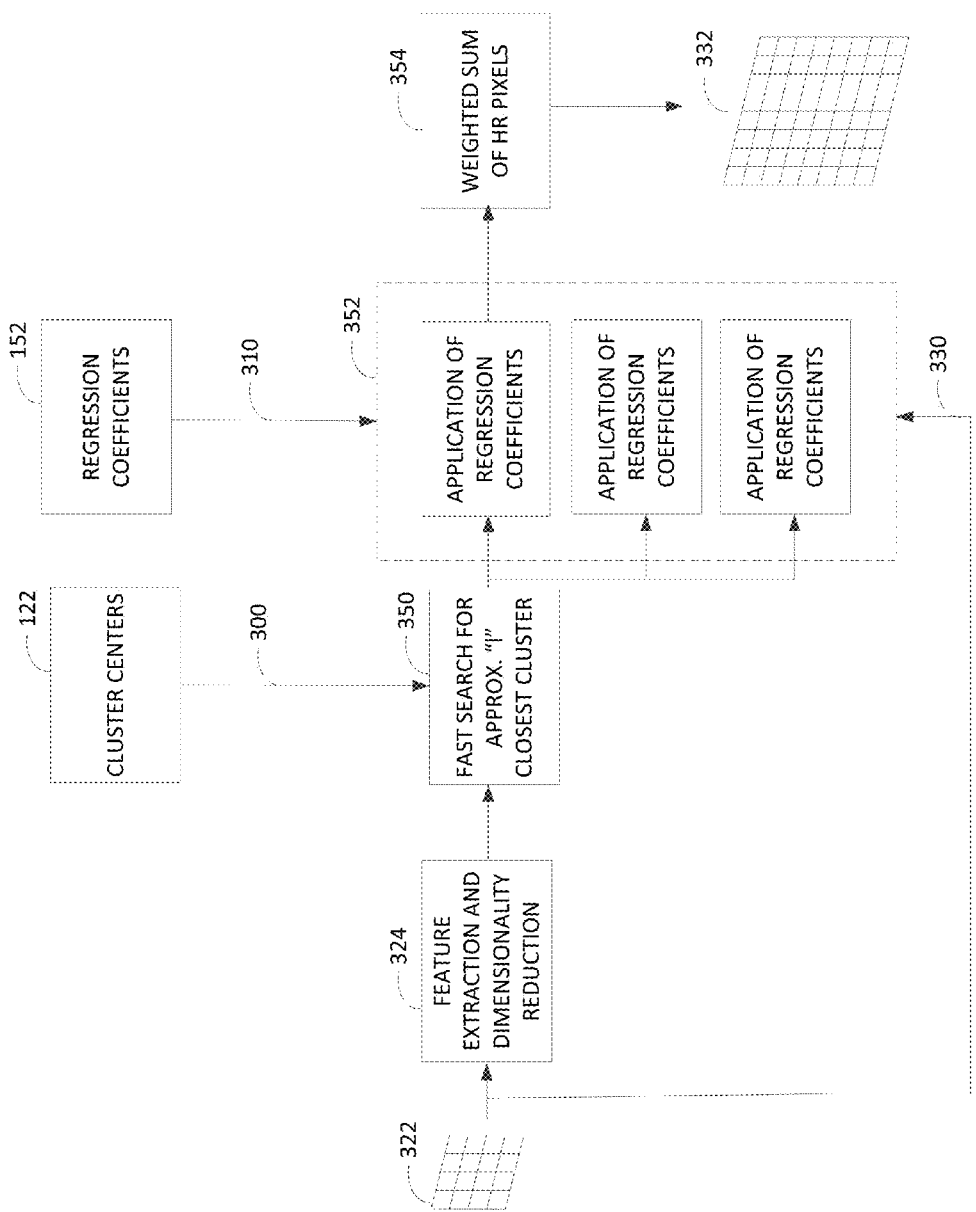
FIG. 4 illustrates another exemplary high resolution image generation technique.

Referring to FIG. 4, in another embodiment, during high resolution image generation the system may use the KD-tree to search for multiple approximate nearest neighbors 350. This results in an improvement in the searching with limited additional computational complexity. Preferably the system may look for the L=3 closest clusters while any number of nearest clusters may be used. Also, the system may perform an application of regression coefficients 352 to the LR input patch 330 based upon the corresponding regression coefficients 310 for each of the multiple selected (L) cluster centers. The high resolution image patches resulting from the multiple application of regression coefficients 352 may be combined in any manner, such as a weighted sum of image samples 354 which then results in the high resolution image 332. This may include combining the pixel values of generated high resolution image patches that may partially overlap, by a weighted average technique.

Figure 5:
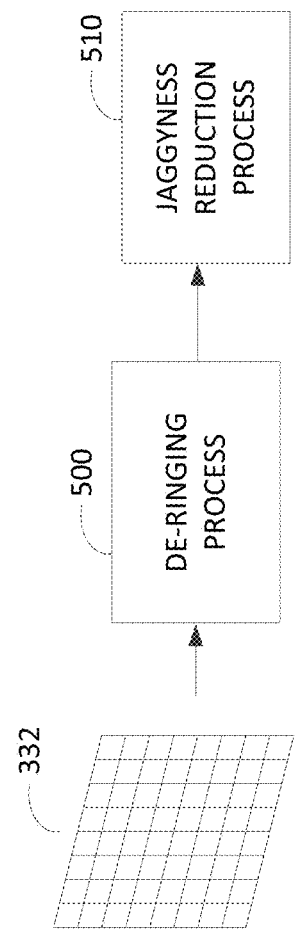
FIG. 5 illustrates a post super-resolution processing technique.

While the results of the regression-based technique provides a high quality image it tends to introduce artifacts near edges such as ringing and jaggyness. Referring to FIG. 5, to decrease the artifacts near the edges, the high resolution output image 332 may be further processed with a de-ringing process 500, and a jaggyness reduction process 510.

Figure 6:
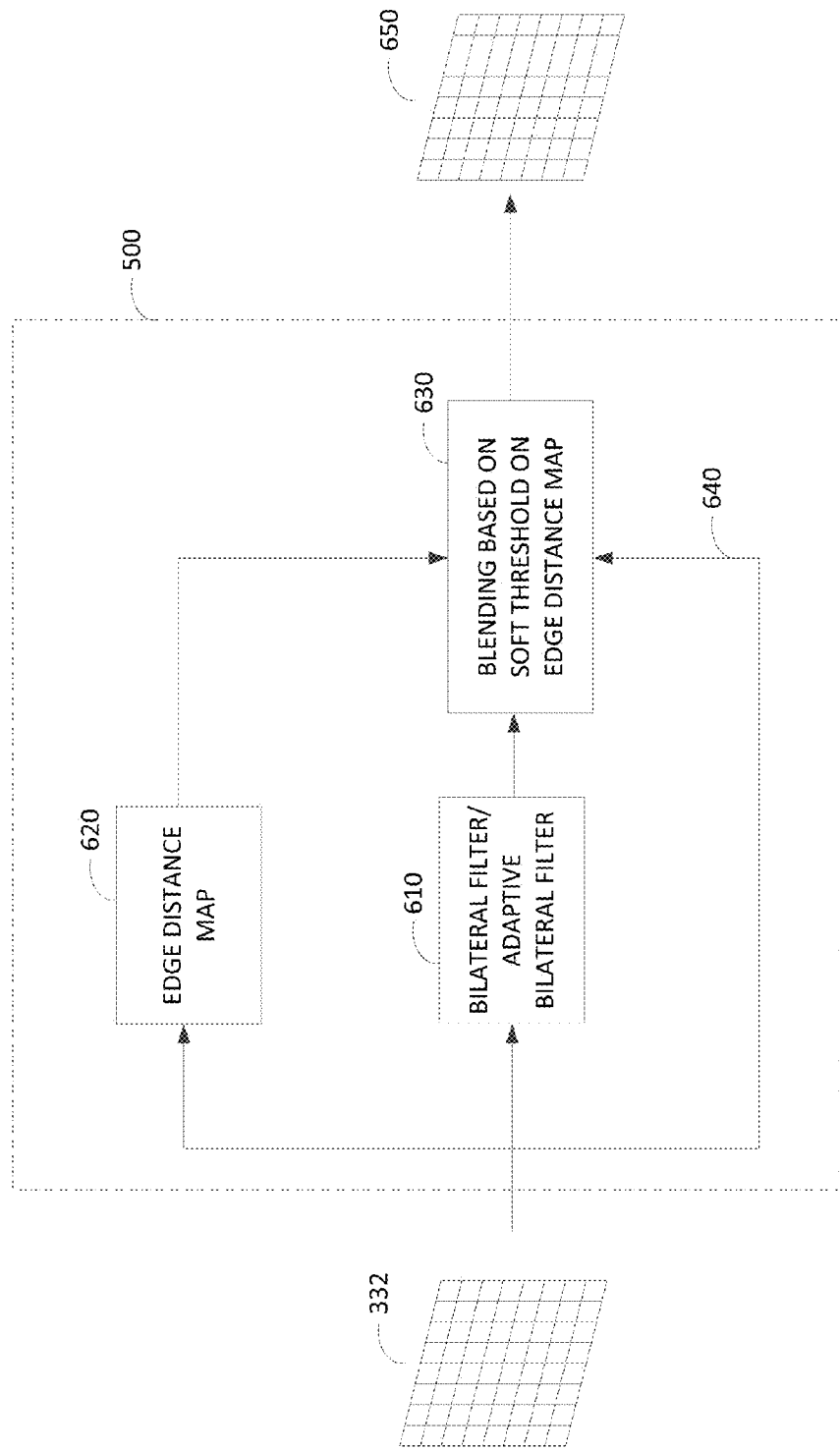
FIG. 6 illustrates a de-ringing processing technique.

Referring to FIG. 6, the de-ringing process 500 may include a local weighted averaging filter, such as a bilateral filter or an adaptive bilateral filter 610 based on the HR image 332. The bilateral filter reduces ringing artifacts near edges by smoothing. However, the bilateral filter may also undesirably smooth fine detail away from edges. Hence, the de-ringing process 500 may use an edge distance map 620 to prevent smoothing detail that is not near an edge. The de-ringing process 500 may determine an edge distance map 620 based upon the HR image 332. The de-ringing process 500 may blend 630 the HR image 640 with the output of the bilateral filter/adaptive bilateral filter 610 based upon a soft threshold on the edge distance map 620. The soft threshold may be controlled by the edge distance map 620. The final output is the weighted sum of the output of the bilateral filter and the original input image, where the weights are locally adapted based on the edge distance map. When the pixel is close to the major edges a higher weight is given to bilateral filtered pixel data, and when the pixel is far away from the major edges, a higher weight is given to the unfiltered HR pixel data 640. When the pixel is far away from the major edges, a lower weight is given to the bilateral filtered pixel data are applied. The output of the blending 630 is a blended image 650. The process may include further edge enhancement by using the known adaptive bilateral filter, instead of the bilateral filter. The adaptive bilateral filter switches from smoothing to sharpening close to a significant edge.

In one embodiment, the blended image 650 is calculated as: $I_{out}=w/d_{th} \times I_{in}+(1-w/d_{th}) \times I_{blt}$, where $d_{th}$ is a constant number which clips the edge distance map. Namely if the edge distance is larger than $d_{th}$, the edge distance is clipped to $d_{th}$, otherwise, the edge distance is recorded as w. The edge map can be obtained from various edge detection techniques, for instance, canny edge detection or sobel edge detection. $I_{out}$, $I_{in}$ and $I_{blt}$ are output image, input image and the filtered image respectively.

Figure 7:
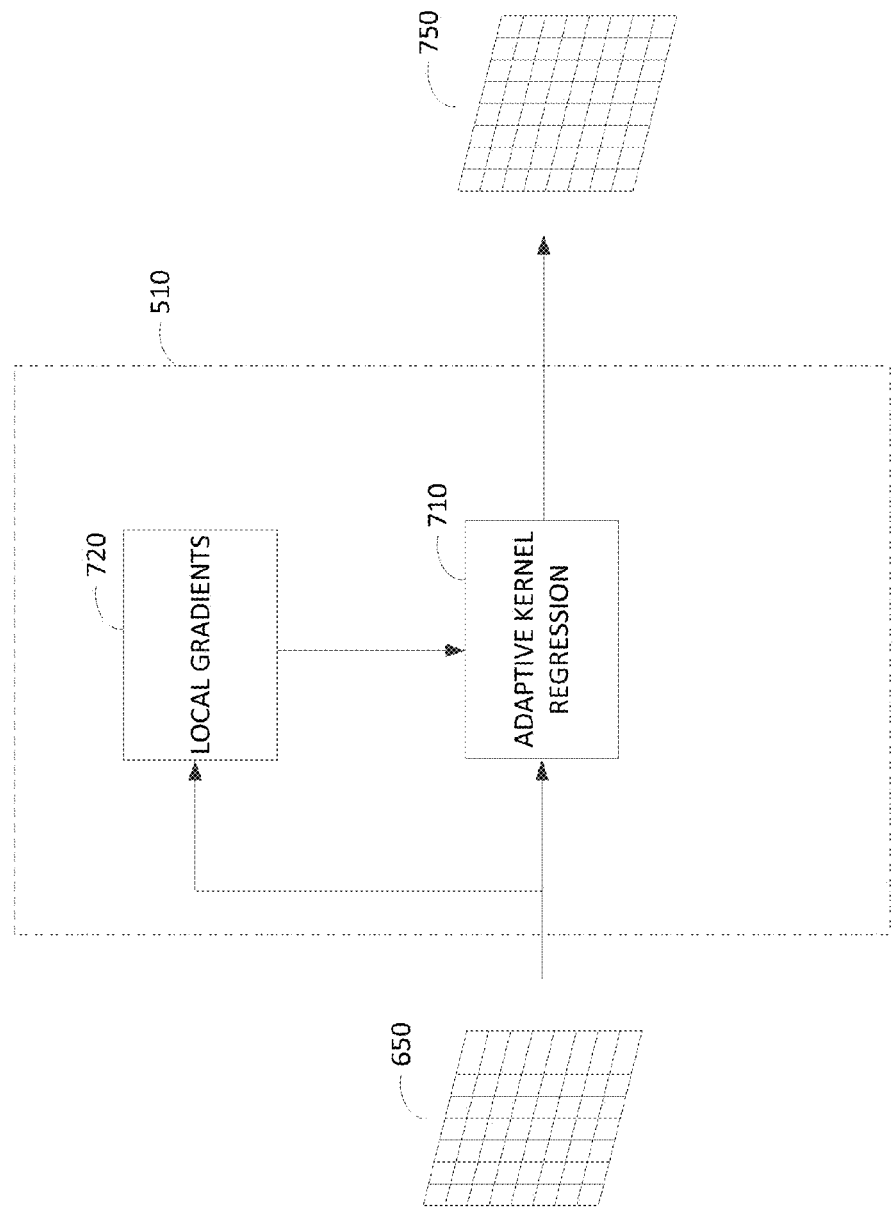
FIG. 7 illustrates a jaggyness reduction technique.

Referring to FIG. 7, the edge jaggyness reduction process 510 may include an adaptive kernel regression filter 710 based upon the blended image 650. The jaggyness reduction process 510 may include the determination of local gradients and local image derivatives 720 based upon the blended image 650. The adaptive kernel regression 710 may be based upon the local derivatives and gradients 720 which are used to control the kernel regression and differentiate jaggy edge artifacts from texture, junctions, and corners. Discriminating strong edges from fine texture detail and other image features is important to avoid undesirable reduction of such fine detail by the jaggyness reduction filter.

The terms and expressions which have been employed in the foregoing specification are used in as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for image enhancement comprising:
  (a) selecting a plurality of patches of an image;
  (b) determining at least one feature for each of said plurality of patches;
  (c) reducing the dimensionality of said at least one feature for each of said plurality of patches to determine a dimensionally reduced feature for each of said plurality of patches;
  (d) determining a generally closest cluster from a set of clusters based on said dimensionally reduced feature for each of said plurality of patches;
  (e) identifying a corresponding set of regression coefficients for each of said generally closest cluster;
  (f) applying said selected regression coefficients to a corresponding said patch to enhance said image.

2. The method of claim 1 wherein said plurality of patches are overlapping with one another.

3. The method of claim 1 wherein said plurality of patches are of an input video sequence.

4. The method of claim 1 wherein said generally closest cluster is determined based upon a KD-Tree process.

5. The method of claim 1 wherein said generally closest cluster is determined based upon a non-exhaustive search process.

6. The method of claim 1 wherein said regression coefficients are based upon least-squares minimization $$C_i^* = \mathrm{argmin}_{C_i} \left\| W_i - C_i \begin{bmatrix} X_i \\ 1 \end{bmatrix} \right\|_2^2,$$

where Ci are said regression coefficients for each said cluster i, Wi are samples of high resolution training patches, Xi are samples of low resolution training patches, and 1 is a vector with the same number of elements as the amount of training patches in Xi filled entirely with ones.

7. The method of claim 1 further comprising selecting a plurality of said generally closest clusters from said set of clusters based on said dimensionally reduced feature for each of said plurality of patches, and selecting said corresponding set of regression coefficients for each of said plurality of said generally closest clusters, and applying each of said set of regression coefficients to said corresponding said patch to enhance said image.

8. The method of claim 1 further comprising applying a de-ringing process to said enhanced image.

9. The method of claim 8 wherein said de-ringing process includes a local weighted averaging filter.

10. The method of claim 9 wherein said de-ringing process includes a soft threshold that is controlled by an edge distance map.

11. The method of claim 1 further comprising applying a jaggyness reduction process to said enhanced image.

12. The method of claim 11 wherein said jaggyness reduction process includes an adaptive filter that is based on local image derivatives.

13. The method of claim 1 wherein each of said clusters and said regression coefficients are based upon a plurality of lower resolution images calculated based upon a plurality of corresponding high resolution images.

14. The method of 13 wherein each said clusters is based upon an extracted feature of each of said lower resolution images.

15. The method of claim 14 wherein each of said clusters is based upon a dimensionality reduced said extracted feature of said lower resolution images.

16. The method of claim 15 wherein said extracted feature is a local derivative feature.

17. The method of claim 16 wherein said dimensionality reduction is based upon a principal component analysis.

18. The method of claim 13 wherein each of said clusters is based upon a clustering process.

19. The method of claim 18 wherein said regression coefficients are determined for a corresponding cluster.

20. The method of claim 19 wherein said determining of said regression coefficients is based on training patches selected from a group of multiple clusters including at least said particular cluster.

21. The method of claim 20 wherein said regression coefficients are based upon least-squares minimization $$C_i^* = \mathrm{argmin}_{C_i} \left\| W_i - C_i \begin{bmatrix} X_i \\ 1 \end{bmatrix} \right\|_2^2,$$

where Ci are said regression coefficients for each said cluster i, Wi are samples of high resolution training patches, Xi are samples of low resolution training patches, and 1 is a vector with the same number of elements as the amount of training patches in Xi filled entirely with ones.

22. The method of claim 13 wherein said clusters and said regression coefficients are based upon minimization of the reconstruction error measured between said plurality of high resolution images and predicted high resolution images.

23. The method of claim 22 wherein said minimization of said reconstruction error is based upon multiple clustering processes and based upon selecting the clustering process resulting in the lowest reconstruction error.

24. The method of claim 22 wherein said minimization of said reconstruction error is based upon optimization of the cluster centers.

* * * * *

UNITED STATES PATENT AND TRADEMARK OFFICE
CERTIFICATE OF CORRECTION

PATENT NO. : 9,589,323 B1  
APPLICATION NO. : 14/827030  
DATED : March 7, 2017  
INVENTOR(S) : Anustup Kumar Choudhury et al.

Page 1 of 1

It is certified that error appears in the above-identified patent and that said Letters Patent is hereby corrected as shown below:

In the Specification

Column 2, Line 37:
Change " $f_1 = [1,0,1], f_2 = f_1^T$ " to read -- $f_1 = [1,0,1], \quad f_2 = f_1^T$ --.

Column 2, Line 39:
Change " $f_3[1,-2,1], f_4 = f_3^T$ " to read -- $f_3 = [1,-2,1], \quad f_4 = f_3^T$ --.

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*